United States Patent
Ding et al.

(10) Patent No.: US 10,821,719 B2
(45) Date of Patent: Nov. 3, 2020

(54) THREE-DIMENSIONAL PRINTING APPARATUS AND METHOD FOR THREE-DIMENSIONAL PRINTING

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Ming-Hsiung Ding, New Taipei (TW); Ching-Yuan Chou, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

(*) Notice: Subject to any disclaimer, the term of this patent is extended or adjusted under 35 U.S.C. 154(b) by 954 days.

(21) Appl. No.: 14/520,349

(22) Filed: Oct. 22, 2014

(65) Prior Publication Data

US 2016/0059485 A1 Mar. 3, 2016

(30) Foreign Application Priority Data

Aug. 29, 2014 (TW) .............................. 103129900 A (51) Int. Cl.
*B33Y 30/00* (2015.01)
*B29C 64/135* (2017.01)
(Continued)

(52) U.S. Cl.
CPC .............. *B33Y 30/00* (2014.12); *B29C 44/18* (2013.01); *B29C 64/135* (2017.08);
(Continued)

(58) Field of Classification Search
CPC ..... B29C 64/20; B29C 64/264; B29C 64/124; B33Y 30/00; B33Y 70/00
See application file for complete search history.

(56) References Cited

U.S. PATENT DOCUMENTS 5,626,919 A * 5/1997 Chapman ................ B29C 41/12
118/413
5,980,813 A * 11/1999 Narang .................... B29C 64/40
264/308

(Continued)

FOREIGN PATENT DOCUMENTS

CN         1701244       11/2005
CN        203317755      12/2013
(Continued)

OTHER PUBLICATIONS

"Office Action of Taiwan Counterpart Application", dated May 9, 2015, p. 1-p. 11, in which the listed references were cited.
(Continued)

*Primary Examiner* — Matthew J Daniels
*Assistant Examiner* — Andrew D Graham
(74) *Attorney, Agent, or Firm* — JCIPRNET (57) ABSTRACT

A method for three-dimensional printing for forming a three-dimensional structure on a moving platform is provided. The three-dimensional structure includes a shell portion and a foamy filling portion. The method includes the following: a digital shell model of the three-dimensional structure is built. Next, the digital shell model is sliced into a plurality of cross-section information. Next, a corresponding liquid forming material is cured on the moving platform according to the cross-section information to form a plurality of shell layers. Next, foaming process is performed on the liquid forming material to form a foamy forming material. Next, the foamy forming material located within the corresponding shell layers is cured to form a plurality of foamy
(Continued)

filling layers. Afterward, the shell layers and the foamy filling layers are alternately formed on the moving platform and stacked to form the three-dimensional structure. A three-dimensional printing apparatus adopting the method is also provided.

1 Claim, 5 Drawing Sheets (51) Int. Cl.
  *B33Y 10/00* (2015.01)
  *B29C 44/18* (2006.01)
  *B29C 64/314* (2017.01)
  *B29K 105/04* (2006.01)

(52) U.S. Cl.
  CPC ............ *B29C 64/314* (2017.08); *B33Y 10/00* (2014.12); *B29K 2105/04* (2013.01)

(56) References Cited

U.S. PATENT DOCUMENTS

| | | | | |
|---|---|---|---|---|
| 7,556,490 | B2 * | 7/2009 | Wicker | B33Y 30/00 425/375 |
| 2004/0187714 | A1 * | 9/2004 | Napadensky | B33Y 70/00 101/35 |
| 2012/0195994 | A1 * | 8/2012 | El-Siblani | B29C 67/007 425/174.4 |
| 2015/0072293 | A1 * | 3/2015 | DeSimone | B29C 67/007 430/322 |
| 2015/0246484 | A1 * | 9/2015 | Hirschberg | B01F 5/0619 366/336 |
| 2015/0321418 | A1 * | 11/2015 | Sterman | B29C 67/0051 264/40.7 |
| 2015/0321434 | A1 * | 11/2015 | Sterman | B29D 35/12 264/255 |
| 2016/0200044 | A1 * | 7/2016 | Voit | B29C 45/00 264/401 |

FOREIGN PATENT DOCUMENTS

| | | |
|---|---|---|
| CN | 103895225 | 7/2014 |
| KR | 100568579 | 3/2006 |
| KR | 100568579 | 4/2006 |
| TW | 201235529 | 9/2012 |

OTHER PUBLICATIONS

Wang et al., "Technology and Development of Stereo Lithography Apparatus Rapid Prototyping", New Technology & New Process, Feb. 25, 2008, pp. 1-3.
"Office Action of Taiwan Counterpart Application", dated Nov. 8, 2016, p. 1-p. 7, in which the listed references were cited.
"Office Action of China Counterpart Application," dated Apr. 19, 2017, p. 1-p. 8, in which the listed references were cited.

* cited by examiner

THREE-DIMENSIONAL PRINTING APPARATUS AND METHOD FOR THREE-DIMENSIONAL PRINTING

CROSS-REFERENCE TO RELATED APPLICATION

This application claims the priority benefit of Taiwan application serial no. 103129900, filed on Aug. 29, 2014. The entirety of the above-mentioned patent application is hereby incorporated by reference herein and made a part of this specification.

BACKGROUND OF THE INVENTION

Field of the Invention

The invention relates to a printing apparatus and a method for printing, and more particularly, to a three-dimensional printing apparatus and a method for three-dimensional printing.

Description of Related Art

In recent years, with the increasing development of technology, many different methods using additive manufacturing technology such as layer by layer model building to build a physical three-dimensional (3D) model have been proposed. In general, additive manufacturing technology converts design information of a 3D model built by software such as computer-aided design (CAD) into a plurality of thin (quasi-two-dimensional) cross-sectional layers stacked continuously. At the same time, many technical means capable of forming a plurality of thin cross-sectional layers have also been gradually proposed. For instance, the printing module of a printing apparatus can generally move above the substrate along an XY-plane according to the spatial coordinates XYZ built by the design information of the 3D model, such that the building material can form a correct cross-sectional layer shape. The deposited building material can be subsequently cured in a natural manner, or cured via heating or irradiation from a light source to form the needed cross-sectional layers. Therefore, since the printing module moves along an axis Z layer by layer, a plurality of cross-sectional layers can be stacked layer by layer along the axis Z. As a result, the building material can form a three-dimensional structure when being cured layer by layer.

Using a technique in which a three-dimensional structure is formed by curing a building material with a light source as an example, the printing module is adapted to be immersed in a liquid forming material filled in a tank, and a light source module irradiates the liquid forming material on the XY-plane. As a result, the liquid forming material is cured and stacked on a moving platform of the printing module. Therefore, since the moving platform of the printing module moves along the axis Z layer by layer, the liquid forming material can be cured layer by layer and stacked into a three-dimensional structure. However, for the formed three-dimensional structure, to save the usage amount of the forming material, the three-dimensional structure is designed to have a plurality of hollow structures to reduce production cost. However, such method readily causes the situation in which the liquid forming material remains in the hollow portions after the hollow portions are sealed by a shell during the forming process. As a result, the remaining liquid forming material readily affects the structural properties and the safety of the three-dimensional structure.

Accordingly, how to save material and prevent the liquid forming material from remaining in the three-dimensional structure at the same time during the forming process of three-dimensional printing is an issue those skilled in the art need to consider and correspondingly solve.

SUMMARY OF THE INVENTION

The invention provides a three-dimensional printing apparatus and a method for three-dimensional printing capable of saving the usage amount of a liquid forming material so as to increase printing efficiency and further increase printing quality.

A three-dimensional printing apparatus of the invention is adapted to form a three-dimensional structure, and the three-dimensional structure includes a shell portion and a foamy filling portion. The three-dimensional printing apparatus includes a first tank, a second tank, a foaming unit, a moving platform, a light source, and a control unit. The first tank is adapted to contain a first liquid forming material. The second tank is adapted to contain a second liquid forming material. The foaming unit is disposed in the second tank and adapted to make the second liquid forming material generate a plurality of bubbles so as to form a foamy forming material. The moving platform is disposed above the first tank and the second tank and adapted to move relative to the first tank and the second tank. The light source is movably disposed on one side of the first tank and the second tank to respectively irradiate and cure the first liquid forming material and the foamy forming material on the moving platform. The control unit is coupled to the light source and the moving platform to control the moving platform to be alternately immersed in the first liquid forming material and the foamy forming material and correspondingly control the light source to alternately cure the first liquid forming material and the foamy forming material on the moving platform layer by layer. The cured first liquid forming material is stacked on the moving platform layer by layer to form the shell portion. The cured foamy forming material is stacked on the moving platform layer by layer to form the foamy filling portion.

The three-dimensional printing apparatus of the invention can be used to form a three-dimensional structure, and the three-dimensional structure includes a shell portion and a foamy filling portion. The three-dimensional printing apparatus includes a tank, a foaming unit, a defoaming unit, a moving platform, a light source, and a control unit. The tank is filled with a liquid forming material. The foaming unit is disposed in the tank and adapted to make the liquid forming material generate a plurality of bubbles so as to form a foamy forming material. The defoaming unit is disposed in the tank and adapted to remove the bubbles in the foamy forming material so the foamy forming material returns to the liquid forming material. The moving platform is movably disposed above the tank. The light source is disposed on one side of the tank to respectively irradiate and cure the liquid forming material and the foamy forming material on the moving platform. The control unit is coupled to the light source, the moving platform, the foaming unit, and the defoaming unit to control the moving platform to be immersed in the liquid forming material and alternately drive the foaming unit and the defoaming unit to perform foaming and defoaming processes on the liquid forming material and to correspondingly control the light source to alternately cure the liquid forming material and the foamy forming material on the moving platform layer by layer. The cured liquid forming material is stacked on the moving platform layer by layer to form the shell portion. The cured foamy forming material is stacked on the moving platform layer by layer to form the foamy filling portion.

A method for three-dimensional printing of the invention can be used to form a three-dimensional structure on a moving platform. Moreover, the three-dimensional structure includes a shell portion and a foamy filling portion. The method for three-dimensional printing includes the following steps. First, a digital shell model of the three-dimensional structure is built. Next, the digital shell model is sliced into a plurality of cross-section information. Next, a corresponding liquid forming material is cured on the moving platform layer by layer according to the cross-section information to form a plurality of shell layers layer by layer. Next, a foaming process is performed on the liquid forming material to form a foamy forming material. Next, the foamy forming material located within the corresponding shell layers is cured to form a plurality of foamy filling layers layer by layer. Afterward, the shell layers and the foamy filling layers are alternately formed on the moving platform layer by layer and stacked to form the shell portion and the foamy filling portion of the three-dimensional structure.

Based on the above, in the invention, a foaming process is performed on the liquid forming material in the tank via the foaming unit to form the foamy forming material, and then the foamy forming material is cured to form the foamy filling portion filled in the shell portion in the three-dimensional structure. Therefore, the three-dimensional printing apparatus of the invention does not need to form a solid three-dimensional structure, and therefore the usage amount of the liquid forming material can be saved, and the time needed for printing can also be saved, thus increasing printing efficiency. Moreover, since the foamy filling portion is filled in the shell portion of the three-dimensional structure, not only can structural rigidity of the three-dimensional structure be maintained, a reinforcing structure such as support columns does not need to be built in the three-dimensional structure, and openings also do not need to be made on the shell portion to let the remaining liquid forming material therein flow out. Therefore, the method for three-dimensional printing and the three-dimensional printing apparatus adopting the method of the invention can indeed effectively increase printing efficiency and can further increase print quality.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The foregoing and other technical contents, features, and effects of the invention are intended to be described more comprehensively in each of the following embodiments accompanied with figures. In the following embodiments, terms used to indicate direction such as "up", "down", "front", "back", "left", and "right", merely refer to directions in the accompanying figures. Therefore, the directional terms are used to illustrate and are not intended to limit the invention. Moreover, in each embodiment below, the same or similar reference numerals are used for the same or similar elements.

Figure 1:
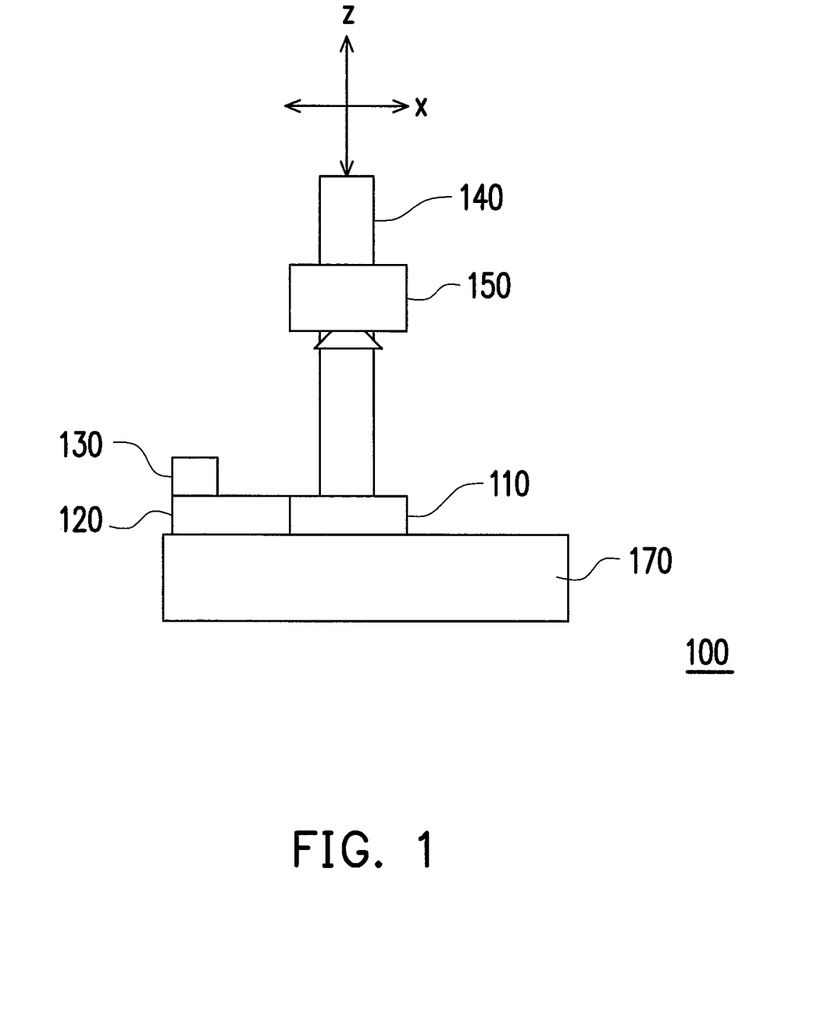
FIG. 1 is a schematic diagram of a three-dimensional printing apparatus according to an embodiment of the invention.
Figure 2:
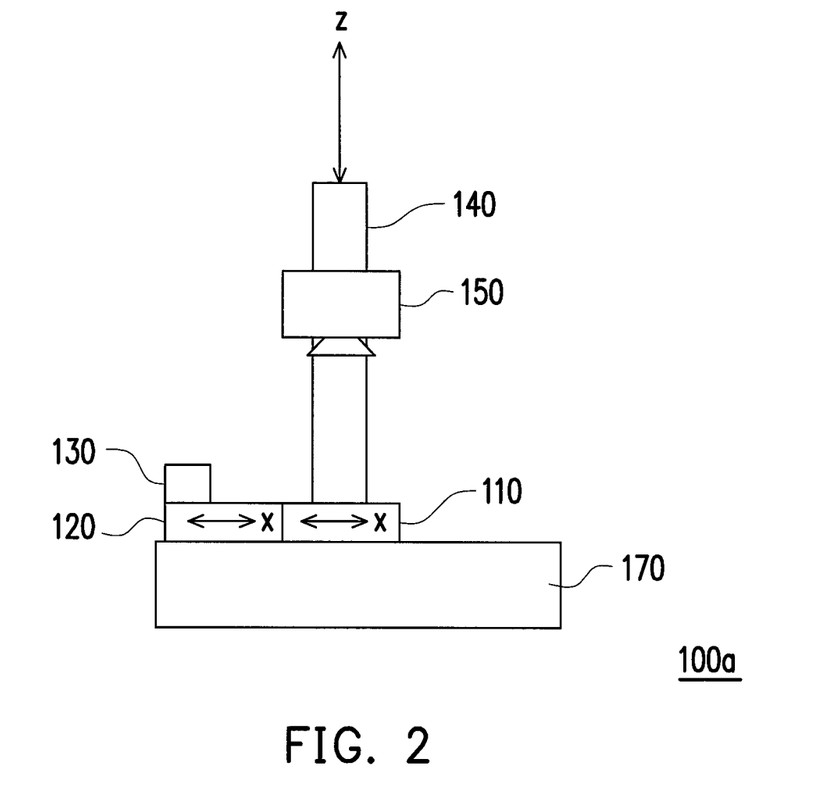
FIG. 2 is a schematic diagram of a three-dimensional printing apparatus according to another embodiment of the invention.
Figure 3:
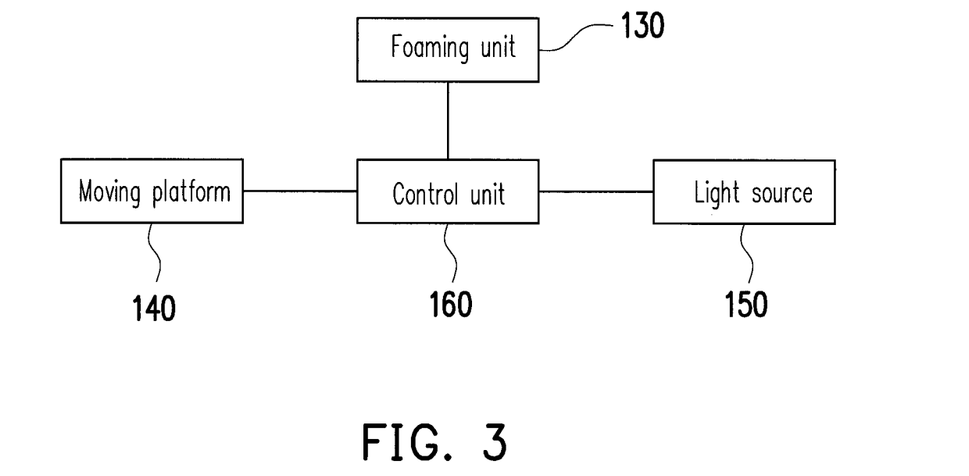
FIG. 3 is a schematic diagram of the coupling of a portion of the components of a three-dimensional printing apparatus according to an embodiment of the invention.

FIG. 1 is a schematic diagram of a three-dimensional printing apparatus according to an embodiment of the invention. FIG. 2 is a schematic diagram of a three-dimensional printing apparatus according to another embodiment of the invention. FIG. 3 is a schematic diagram of the coupling of a portion of the components of the three-dimensional printing apparatus of FIG. 1. FIG. 4A to FIG. 4D are schematic diagrams of the fabrication process of a three-dimensional object according to an embodiment of the invention. It should be mentioned here that, the right side in FIG. 4A to FIG. 4D shows cross-sectional schematic diagrams of a three-dimensional structure 10, and the left side in FIG. 4A to FIG. 4D shows top schematic diagrams of the three-dimensional structure 10. In the present embodiment, a three-dimensional printing apparatus 100 can be used to form the three-dimensional structure 10 as shown in FIG. 4D, wherein the three-dimensional structure 10 includes a shell portion 12 and a foamy filling portion 14. The shell portion 12 has a sealed housing space, and the foamy filling portion 14 is filled in the sealed housing space as shown in FIG. 4D.

The three-dimensional printing apparatus 100 includes a first tank 110, a second tank 120, a foaming unit 130, a moving platform 140, a light source 150, and a control unit 160. The control unit 160 is adapted to read a digital three-dimensional model and is coupled to the foaming unit 130, the moving platform 140, and the light source 150 as shown in FIG. 3 to control the movement of the foaming unit 130, the moving platform 140, and the light source 150 according to the digital three-dimensional model. In the present embodiment, the digital three-dimensional model can be a digital three-dimensional image file constructed by, for instance, a computer via, for instance, a computer-aided design (CAD) or an animation modeling software.

In the present embodiment, the three-dimensional printing apparatus 100 can further include a frame 170, and the first tank 110 and the second tank 120 are disposed on the frame 170. The first tank 110 is adapted to contain a first liquid forming material, and the second tank 120 is adapted to contain a second liquid forming material. The material of each of the first liquid forming material and the second liquid forming material can be photosensitive resin. The foaming unit 130 is disposed at the second tank 120 and adapted to make the second liquid forming material generate a plurality of bubbles so as to form a foamy forming material. For instance, the foaming unit 130 can be an air pump adapted to pump the second liquid forming material, so as to make the second liquid forming material generate a plurality of bubbles to form a foamy forming material. The moving platform 140 is disposed above the first tank 110 and the second tank 120 and adapted to move relative to the first tank 110 and the second tank 120. Specifically, in the present embodiment, the moving platform 140 can move between the first tank 110 and the second tank 120 along, for instance, the X direction as shown in FIG. 1, and is adapted to respectively move towards the first tank 110 and the second tank 120 along, for instance, the Z direction as shown in FIG. 1 to be immersed in the first liquid forming material and the foamy forming material. Therefore, the moving platform 140 alternately moves between the first tank 110 and the second tank 120 to be alternately immersed in the first liquid forming material and the foamy forming material.

FIG. 2 is a schematic diagram of a three-dimensional printing apparatus according to another embodiment of the invention. It should be mentioned here that, a three-dimensional printing apparatus 100a of the present embodiment is similar to the three-dimensional printing apparatus 100 of FIG. 1, and therefore the present embodiment uses the reference numerals of the above embodiment and a portion of the contents thereof, wherein the same reference numerals are used to represent the same or similar elements and the same technical content is omitted. The omitted portions are as described in the above embodiment and are not repeated in the present embodiment. Referring to FIG. 2, the differences between the three-dimensional printing apparatus 100a of the present embodiment and the three-dimensional printing apparatus 100 of FIG. 1 are described hereinafter. In the present embodiment, the first tank 110 and the second tank 120 are adapted to move along, for instance, the X direction as shown in FIG. 2 to respectively move to a location underneath the moving platform 140 and the location corresponds to the moving platform 140. Specifically, the first tank 110 and the second tank 120 can alternately move to the location underneath the moving platform 140 such that the moving platform 140 can be alternately immersed in the first liquid forming material and the foamy forming material. Of course, the invention is not limited thereto. The scope of the present application to be protected includes the moving platform 140 being able to move relative to the first tank 110 and the second tank 120 such that the moving platform 140 can alternately correspond to the location of each of the first tank 110 and the second tank 120 so as to be alternately immersed in the first liquid forming material and the foamy forming material.

Moreover, the light source 150 is disposed below the swinging tank 110 and adapted to irradiate and cure a specific portion of the liquid forming material 116. The light source 150 is movably disposed on one side of the first tank 110 and the second tank 120 to respectively irradiate and cure the first liquid forming material and the foamy forming material on the moving platform 140. The three-dimensional printing apparatus 100 is adapted to read the digital three-dimensional model and crosscut the digital three-dimensional model into a plurality of cross-sections. The control unit 160 controls the light source 150 to irradiate and cure the corresponding first liquid forming material and the foamy forming material on the moving platform 140 according to the cross-sections of the digital three-dimensional model. The moving platform 140 moves away from the light source 150 layer by layer to stack and form the three-dimensional structure 10 on the moving platform 140 layer by layer, and the three-dimensional structure 10 is obtained via the irradiation and the curing of the liquid forming material 116 by the light source 140.

Specifically, the control unit 160 controls the moving platform 140 to be alternately immersed in the first liquid forming material and the foamy forming material and correspondingly controls the light source 150 to alternately cure the first liquid forming material and the foamy forming material on the moving platform 140 layer by layer. Therefore, the first liquid forming material cured via irradiation is stacked on the moving platform 140 layer by layer to form the shell portion 12 of the three-dimensional structure 10 as shown in FIG. 4D, and the foamy forming material cured via irradiation is stacked on the moving platform 140 layer by layer to form the foamy filling portion 14 of the three-dimensional structure 10.

Figure 4A:
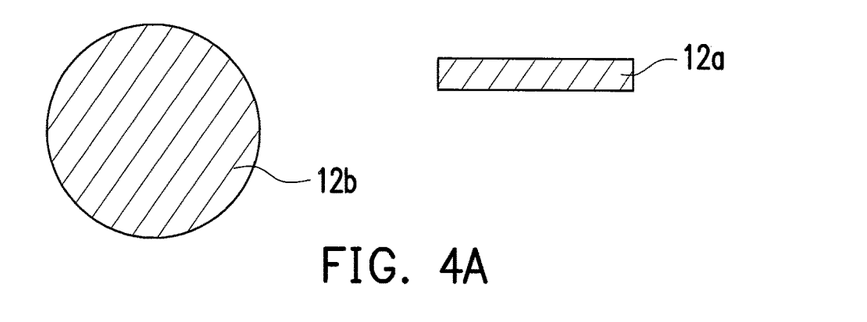
FIG. 4A to FIG. 4D are schematic diagrams of the fabrication process of a three-dimensional object according to an embodiment of the invention.
Figure 4B:
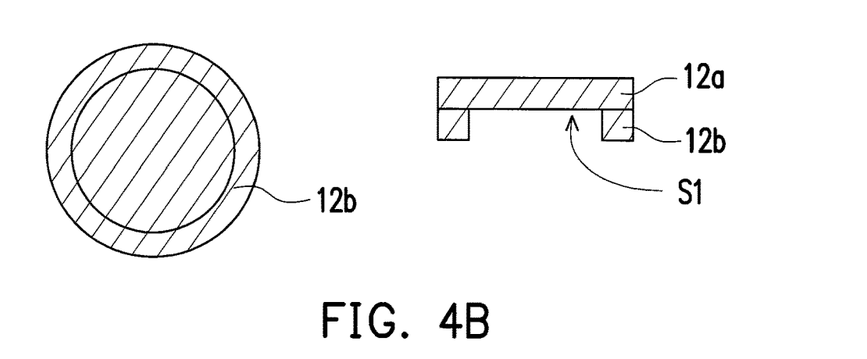
Figure 4C:
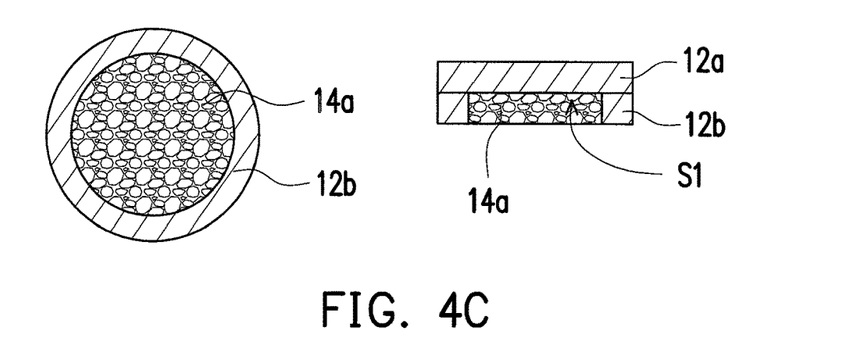
Figure 4D:
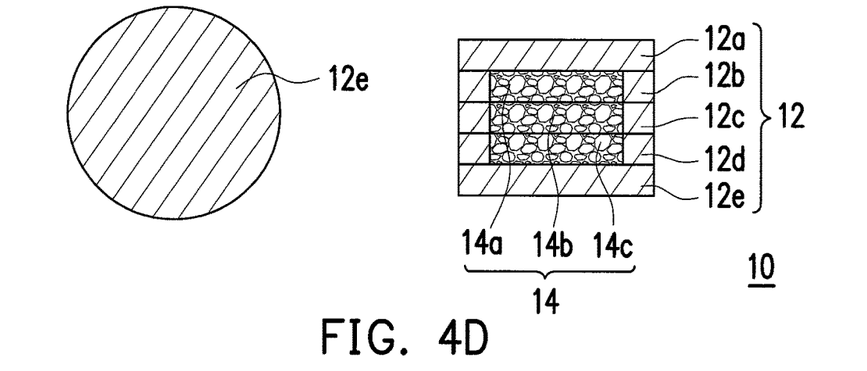

For instance, the printing steps of the three-dimensional structure 10 by three-dimensional printing apparatus 100 as shown in FIG. 4D are as follows: first, the control unit 160 controls the moving platform 140 to be immersed in the first liquid forming material in the first tank 110 and controls the light source 150 to cure a corresponding portion of the first liquid forming material on the moving platform 140 according to the digital three-dimensional model to form a shell layer 12a as shown in FIG. 4A. Then, the control unit 160 controls the moving platform 140 to move toward a direction away from the light source 150 and controls the light source 150 to cure a corresponding portion of the first liquid forming material on the moving platform 140 according to the digital three-dimensional model to form a shell layer 12b stacked on the shell layer 12a as shown in FIG. 4B. The shell layer 12a and the shell layer 12b define an open housing space S1 together. Then, the control unit 160 controls the moving platform 140 to move to the second tank 120 and be immersed in the foamy forming material in the second tank 120, and then controls the light source 150 to cure the foamy forming material located within the open housing space S1 on the moving platform 140 to form a foamy filling layer 14a.

The steps are repeated, such that the moving platform 140 alternately moves between the first tank 110 and the second tank 120 to be alternately immersed in the first liquid forming material and the foamy forming material and to make the moving platform 140 move toward a direction away from the light source 150 layer by layer to form shell layers 12a, 12b, 12c, 12d, and 12e and foamy filling layers 14a, 14b, and 14c as shown in FIG. 4D on the moving platform 140 layer by layer. The shell layers 12a, 12b, 12c, 12d, and 12e are stacked on one another to form the shell portion 12, and the foamy filling layers 14a, 14b, and 14c are stacked on one another to form the foamy filling portion 14 filled in the shell portion 12. In this way, the three-dimensional structure 10 as shown in FIG. 4D is formed.

Under such configuration, in the three-dimensional printing apparatus 100 of the present embodiment, the foamy filling portion 14 can be filled in the shell portion 12 such that a solid three-dimensional structure 10 does not need to be formed. As a result, the usage amount of the liquid forming material can be saved, and the time needed for printing can further be saved, thus increasing printing efficiency. Moreover, since the foamy filling portion 14 is filled in the shell portion 12 of the three-dimensional structure 10, not only can structural rigidity of the three-dimensional structure 10 be increased, a reinforcing structure such as a support column does not need to be additionally designed in the three-dimensional structure 10, and therefore printing steps can be simplified.

Figure 5:
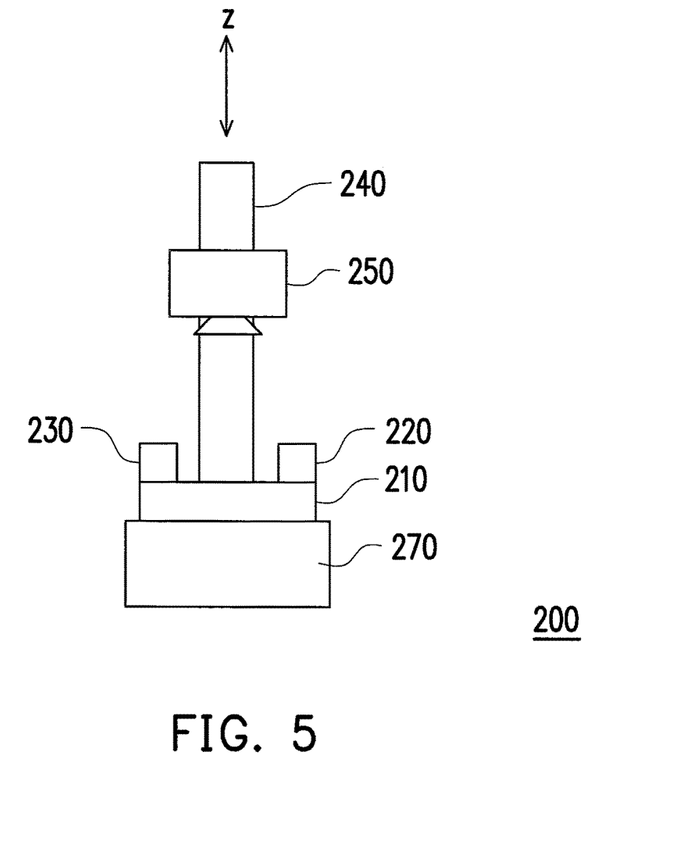
FIG. 5 is a schematic diagram of a three-dimensional printing apparatus according to another embodiment of the invention.
Figure 6:
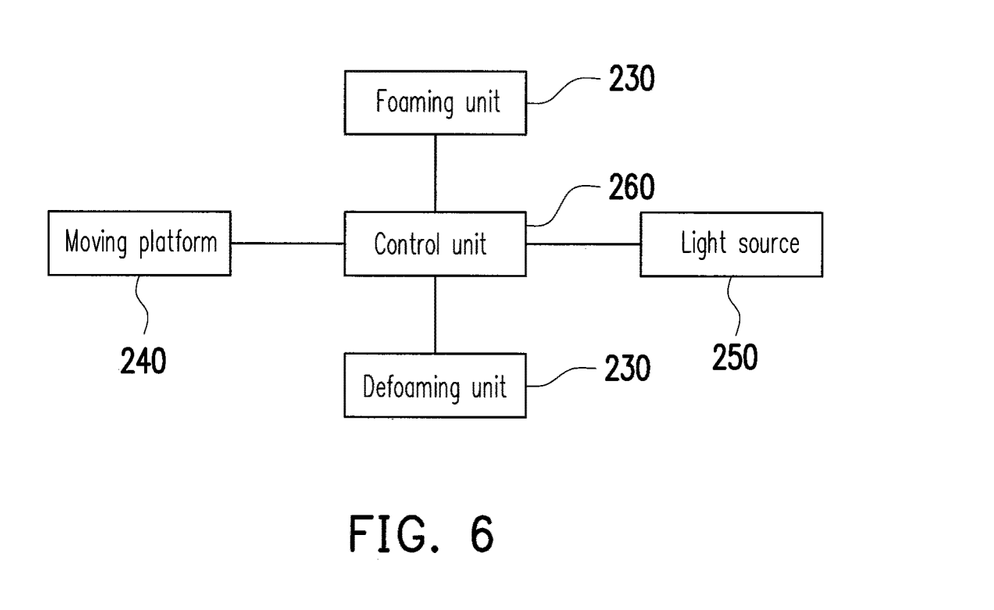
FIG. 6 is a schematic diagram of the coupling of a portion of the components of the three-dimensional printing apparatus of FIG. 5.

FIG. 5 is a schematic diagram of a three-dimensional printing apparatus according to another embodiment of the invention. FIG. 6 is a schematic diagram of the coupling of a portion of the components of the three-dimensional printing apparatus of FIG. 5. It should be mentioned here that, a three-dimensional printing apparatus 200 of the present embodiment is similar to the three-dimensional printing apparatuses 100 and 100a of FIG. 1 to FIG. 3, and therefore the present embodiment uses the reference numerals of the above embodiments and a portion of the contents thereof, wherein the same reference numerals are used to represent the same or similar elements and the same technical content is omitted. The omitted portions are as described in the above embodiments and are not repeated in the present embodiment. Referring to FIG. 5 and FIG. 6, the differences between the three-dimensional printing apparatus 200 of the present embodiment and the three-dimensional printing apparatuses 100 and 100a of FIG. 1 to FIG. 3 are described.

The three-dimensional printing apparatus 200 of the present embodiment includes a tank 210, a foaming unit 220, a defoaming unit 230, a moving platform 240, a light source 250, and a control unit 260, and the main difference between the three-dimensional printing apparatus 200 and three-dimensional printing apparatus 100 is: the three-dimensional printing apparatus 200 only has one tank 210 filled with a liquid forming material, and the foaming unit 220 and the defoaming unit 230 are both disposed in the tank 210. In the present embodiment, the three-dimensional printing apparatus 200 can further include a frame 270 such that the tank 210 is disposed on the frame 270.

The foaming unit 220 is adapted to make the liquid forming material generate a plurality of bubbles to form a foamy forming material, and the defoaming unit 230 is adapted to remove the bubbles in the foamy forming material to return the foamy forming material to the liquid forming material. In the present embodiment, the foaming unit 220 can be an air pump, and the defoaming unit 230 can be a vacuum degassing apparatus or a centrifuge apparatus performing defoaming via a method of centrifugal rotation of the tank 210. Of course, the invention is not limited thereto. The moving platform 240 is movably disposed above the tank 210 and the light source 250 is disposed on one side of the tank 210 to respectively irradiate and cure the liquid forming material and the foamy forming material on the moving platform 240.

Under such configuration, the control unit 260 can couple the foaming unit 220, the defoaming unit 230, the moving platform 240, and the light source 250 as shown in FIG. 6 to control the moving platform 240 to be immersed in the liquid forming material and alternately drive the foaming unit 220 and the defoaming unit 230 to perform foaming and defoaming on the liquid forming material and to correspondingly control the light source 250 to alternately cure the liquid forming material and the foamy forming material on the moving platform 240 layer by layer. The cured liquid forming material is stacked on the moving platform 240 layer by layer to form the shell portion 12 as shown in FIG. 4D. The cured foamy forming material is stacked on the moving platform 240 layer by layer to form the foamy filling portion 14 as shown in FIG. 4D.

For instance, the printing steps of the three-dimensional structure 10 by the three-dimensional printing apparatus 200 as shown in FIG. 4D are as follows: first, the control unit 260 controls the moving platform 240 to be immersed in the liquid forming material in the tank 210 and controls the light source 250 to cure a corresponding portion of the liquid forming material on the moving platform 240 according to the digital three-dimensional model to form the shell layer 12a as shown in FIG. 4A. Then, the control unit 260 controls the moving platform 240 to move away from the light source 250 and controls the light source 250 to cure a corresponding portion of the liquid forming material on the moving platform 240 according to the digital three-dimensional model to form the shell layer 12b stacked on the shell layer 12a as shown in FIG. 4B. The shell layer 12a and the shell layer 12b define an open housing space S1 together.

Next, the control unit 260 controls the moving platform 240 to move away from the light source 250 and drives the foaming unit 220 to perform foaming process on the liquid forming material to form a foamy forming material, and then controls the light source 250 to cure the foamy forming material located within the open housing space S1 on the moving platform 240 to form the foamy filling layer 14a. Then, the control unit 260 drives the defoaming unit 230 to perform defoaming process on the foamy forming material so the foamy forming material returns to the liquid forming material which is foamless, and then controls the moving platform 240 to move away from the light source 250 and controls the light source 250 to cure a corresponding portion of the liquid forming material on the moving platform 240 according to the digital three-dimensional model, so as to form the shell layer 12c stacked on the shell layer 12b as shown in FIG. 4D.

The steps are repeated, such that the control unit 260 alternately drives the foaming unit 220 and the defoaming unit 230 to perform foaming and defoaming process on the liquid forming material and correspondingly controls the light source 250 to alternately cure the liquid forming material and the foamy forming material on the moving platform 240 layer by layer so as to form the shell layers 12a, 12b, 12c, 12d, and 12e and the foamy filling layers 14a, 14b, and 14c as shown in FIG. 4D on the moving platform 240 layer by layer. The shell layers 12a, 12b, 12c, 12d, and 12e are stacked on one another to form the shell portion 12, and the foamy filling layers 14a, 14b, and 14c are stacked on one another to form the foamy filling portion 14 filled in the shell portion 12. In this way, the three-dimensional structure 10 as shown in FIG. 4D is formed.

Under such configuration, the three-dimensional printing apparatus 200 of the present embodiment can form the shell portion 12 and the foamy filling portion 14 of the three-dimensional structure 10 via one tank 210, and the shell portion 12 has a sealed housing space and the foamy filling portion 14 is filled in the sealed housing space. In this way, there is no need to form a solid three-dimensional structure 10. As a result, the usage amount of the liquid forming material can be saved, and the time needed for printing can further be saved, thus increasing printing efficiency. Moreover, since the foamy filling portion 14 is filled in the shell portion 12 of the three-dimensional structure 10, not only can structural rigidity of the three-dimensional structure 10 be maintained, a reinforcing structure such as a support column does not need to be additionally designed in the three-dimensional structure 10, and therefore printing steps can be simplified.

Figure 7:
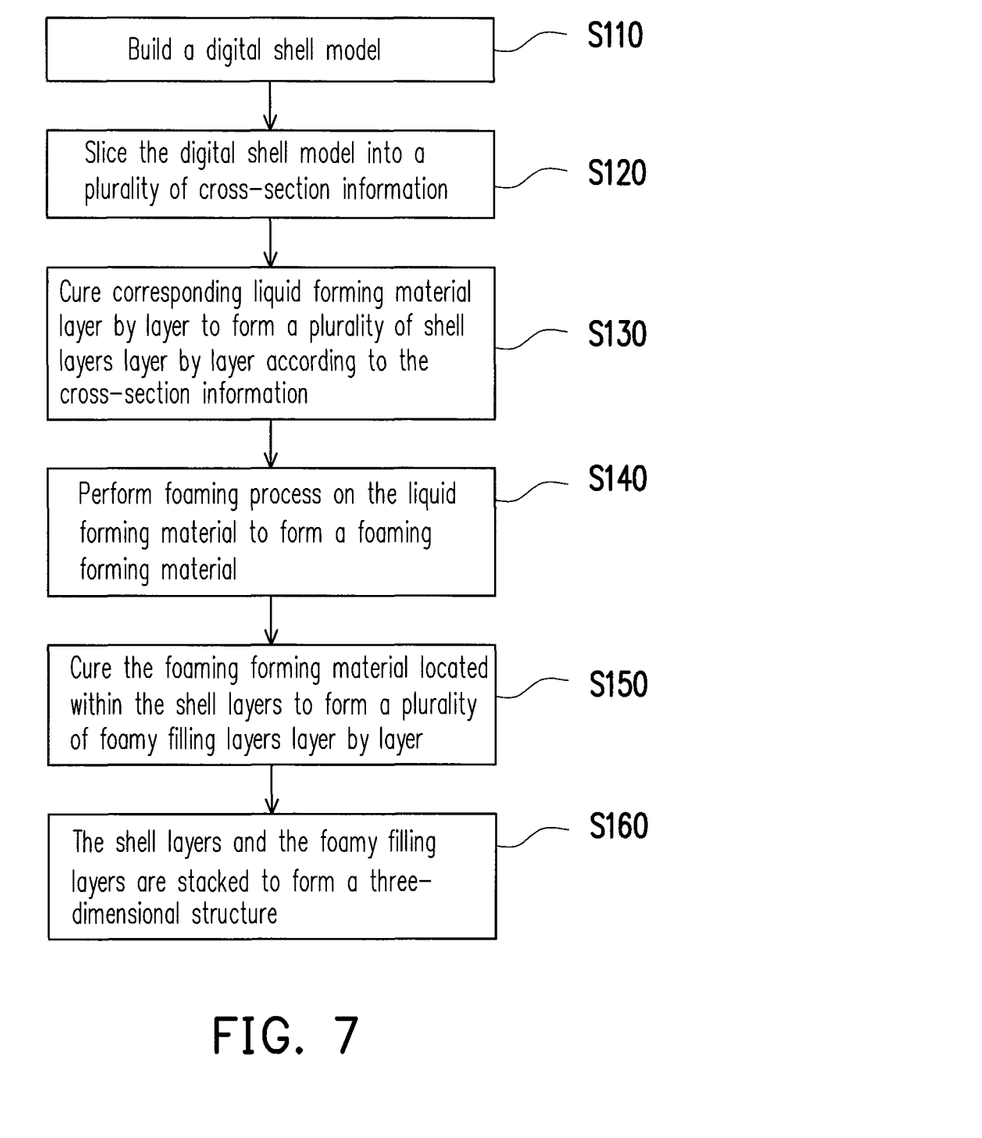
FIG. 7 is a schematic diagram of the process of a method for three-dimensional printing according to an embodiment of the invention.

FIG. 7 is a schematic diagram of the process of a method for three-dimensional printing according to an embodiment of the invention. Referring to FIG. 4A to FIG. 4D and FIG. 7, the method of three-dimensional printing of the present embodiment can be applied in the three-dimensional printing apparatuses 100 and 200 to form the three-dimensional structure 10 on the moving platforms 140 and 240 of the three-dimensional printing apparatuses 100 and 200, wherein the three-dimensional structure 10 includes a shell portion 12 and a foamy filling portion 14. The shell portion 12 has a sealed housing space, and the foamy filling portion 14 is filled in the sealed housing space. The method for three-dimensional printing includes the following steps: first, step S110 is executed, in which a digital shell model of the three-dimensional structure 10 is built. Next, step S120 is executed, in which the digital shell model is sliced into a plurality of cross-section information, and the cross-section information is, for instance, related to the shell layers 12a, 12b, 12c, 12d, and 12e as shown in FIG. 4D.

Next, step S130 is executed, in which a corresponding liquid forming material is cured on the moving platform layer by layer according to the cross-section information to form the plurality of shell layers 12a, 12b, 12c, 12d, and 12e layer by layer. Specifically, the control units 160 and 260 of the three-dimensional printing apparatuses 100 and 200 can control the light source 150 to cure the corresponding liquid forming material on the moving platforms 140 and 240 layer by layer according to the cross-section information. Next, step S140 is performed to perform foaming process on the liquid forming material to form a foamy forming material, and then step S150 is executed to cure the foamy forming material located within the corresponding shell layers 12a, 12b, 12c, 12d, and 12e to form the plurality of foamy filling layers 14a, 14b, and 14c layer by layer.

Specifically, the control units 160 and 260 control the foaming unit to perform foaming on the liquid forming material each time a shell layer 12a/12b/12c/12d/12e is cured to form the foamy forming material, and then cure the foamy forming material located within the corresponding shell layers 12a/12b/12c/12d/12e to form the corresponding foamy filling layers 14a/14b/14c. Then, defoaming process may, for instance, be performed on the foamy forming material, so the foamy forming material returns to the liquid forming material which is foamless, and then the foamless liquid forming material is cured to form the next shell layer. Alternately, the moving platform can be moved to and immersed in another tank filled with the foamless liquid forming material and the foamless liquid forming material is cured to form the next shell layer. The steps are repeated to alternately form the shell layers and the foamy filling layers on the moving platforms 140 and 240 layer by layer. As a result, the shell portion 12 and the foamy filling portion 14 of the three-dimensional structure 10 as shown in FIG. 4D can be stacked on the moving platform as recited in step S160. In the present embodiment, material of the liquid forming material can be photosensitive resin capable of being cured via irradiation from a light source.

Based on the above, in the invention, foaming is performed on the liquid forming material in the tank via the foaming unit to form the foamy forming material, and then the foamy forming material is cured to form the foamy filling portion filled in the shell portion in the three-dimensional structure. Therefore, the three-dimensional printing apparatus of the invention does not need to form a solid three-dimensional structure, and therefore the usage amount of the liquid forming material can be saved, and the time needed for printing can further be saved, thus increasing printing efficiency. Moreover, since the foamy filling portion is filled in the shell portion of the three-dimensional structure, not only can structural rigidity of the three-dimensional structure be maintained, a reinforcing structure such as a support column does not need to be additionally designed in the three-dimensional structure, and openings also do not need to be made on the shell portion to let the remaining liquid forming material therein flow out. Therefore, the method for three-dimensional printing and the three-dimensional printing apparatus adopting the method of the invention can indeed effectively increase printing efficiency and can further increase printing quality.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:

1. A three-dimensional printing apparatus, used to form a three-dimensional structure, the three-dimensional structure comprising a shell portion and a foamy filling portion, comprising:
    a tank filled with a liquid forming material;
    a foaming unit disposed in the tank and adapted to make the liquid forming material generate a plurality of bubbles to form a foamy forming material;
    a centrifuge defoaming unit disposed at the tank and adapted to remove the bubbles in the foamy forming material to return the foamy forming material to the liquid forming material;
    a moving platform movably disposed above the tank;
    a translating light source movably disposed on one side of the tank to respectively irradiate and cure the liquid forming material and the foamy forming material on the moving platform; and
    a control unit coupled to the translating light source, the moving platform, the foaming unit, and the centrifuge defoaming unit to control the moving platform to be immersed in the liquid forming material and alternately drive the foaming unit and the centrifuge defoaming unit to perform foaming and defoaming processes on the liquid forming material and correspondingly control the translating light source to alternately cure the liquid forming material and the foamy forming material on the moving platform layer by layer, wherein the cured liquid forming material is stacked on the moving platform layer by layer to form the shell portion, and the cured foamy forming material is stacked on the moving platform layer by layer to form the foamy filling portion.

* * * * *